(12) United States Patent
Wang et al.

(10) Patent No.: US 9,232,583 B2
(45) Date of Patent: Jan. 5, 2016

(54) FLYBACK BOOST CIRCUIT, LED BACKLIGHT DRIVING CIRCUIT AND LIQUID CRYSTAL DEVICE

(71) Applicant: Shenzhen China Star Optoelectronics Technology Co., Ltd., Shenzhen, Guangdong (CN)

(72) Inventors: Zhao Wang, Shenzhen (CN); Dan Cao, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 76 days.

(21) Appl. No.: 14/346,714

(22) PCT Filed: Jan. 15, 2014

(86) PCT No.: PCT/CN2014/070674
§ 371 (c)(1),
(2) Date: Mar. 21, 2014

(87) PCT Pub. No.: WO2015/100805
PCT Pub. Date: Jul. 9, 2015

(65) Prior Publication Data
US 2015/0201472 A1    Jul. 16, 2015

(51) Int. Cl.
*H05B 37/02* (2006.01)
*H05B 33/08* (2006.01)
*G02F 1/1335* (2006.01)
*H02M 3/335* (2006.01)

(52) U.S. Cl.
CPC ...... *H05B 33/0815* (2013.01); *G02F 1/133603* (2013.01); *H02M 3/33569* (2013.01); *H05B 33/0827* (2013.01); *H05B 37/02* (2013.01)

(58) Field of Classification Search
CPC .................. H05B 33/08; H05B 37/02
USPC ......... 315/224, 274, 276, 287, 294, 307, 308, 315/360; 363/15, 17, 21, 25, 97, 131
See application file for complete search history.

(56) References Cited

U.S. PATENT DOCUMENTS

| | | | |
|---|---|---|---|
| 5,903,448 A | 5/1999 | Davila, Jr. | |
| 8,120,273 B2 * | 2/2012 | Edwards | H05B 33/0848 315/185 R |
| 8,299,730 B2 * | 10/2012 | Gaknoki et al. | 315/307 |
| 2014/0160808 A1 * | 6/2014 | Sato | 363/21.02 |

* cited by examiner

*Primary Examiner* — Tung X Le
(74) *Attorney, Agent, or Firm* — Andrew C. Cheng

(57) ABSTRACT

A flyback boost circuit is disclosed. The flyback boost circuit includes a converter, a switch module, a driving module and an output diode. The converter includes n number of primary coils and one secondary col. The switch module includes n number of switch components. Homonymous ends of the n number of primary coils respectively connect to the n number of switch components. The other end of the n number of primary coils respectively connects to an input voltage. The homonymous ends of the secondary coil connect to a positive end of the output diode, and the other end of the secondary coil is grounded. An output capacitor is connected between a negative end of the output diode and the ground. The driving module respectively provides control signals to n number of switch components such that only one of n number of switch components is sequentially turned on within a time period for which the duty cycle ratio equals to D. A sum of the duty cycle ratio of the n number of switch components is D. Wherein n is an integer larger than or equaling to 2. In addition, the LED backlight driving circuit having the above flyback boost circuit and the liquid crystal device having the LED backlight driving circuit are disclosed.

20 Claims, 3 Drawing Sheets

FLYBACK BOOST CIRCUIT, LED BACKLIGHT DRIVING CIRCUIT AND LIQUID CRYSTAL DEVICE

BACKGROUND OF THE INVENTION

1. Field of the Invention

The present disclosure relates to a flyback boost circuit, a LED backlight driving circuit including the flyback boost circuit, and a liquid crystal device including the LED backlight driving circuit.

2. Discussion of the Related Art

With the technology revolution, backlight technology of LCDs has been developed. Typical LCDs adopt cold cathode fluorescent lamps (CCFL) as the backlight sources. However, as the CCFL backlight is characterized by attributes including low color reduction ability, low lighting efficiency, high discharging voltage, bad discharging characteristics in low temperature, and also, the CCFL needs a long time to achieve a stable gray scale, LED backlight source is a newly developed technology. For LCDs, the LED backlight source is arranged opposite to the liquid crystal panel so as to provide the light source to the liquid crystal panel.

The driving circuit of the LED backlight source generally includes a boost circuit for converting a voltage provided by a power module to a needed output voltage to the LED unit. Flyback converter is one widely adopted boost circuit, which is also called as inductive-energy-storage converter. When the main transistor of the flyback converter is turn on, the circuit only stores the energy without transmitting the energy. The circuit transmits the energy only when the main transistor is turn off. The flyback converter is characterized by attributes such as it includes the least amount of component, highest reliability, and lowest cost.

FIG. 1 shows a typical flyback boost circuit including a converter, a MOS transistor (Q), and an output diode (Do). The converter includes a primary coil (P) and a secondary coil (S). The turn ratio of the primary coil (P) to the secondary coil (S) is K. The homonymous end of the primary coil (P) connects to the drain of the MOS transistor (Q), and the other end of the primary coil (P) connects to the input voltage (Vin). The source of the MOS transistor (Q) is grounded. The gate of the MOS transistor (Q) is controlled by pulse signals (DRV). The input voltage (Vin) is grounded via a filter capacitor (C). The homonymous end of the secondary coil (S) connects to a positive end of the output diode (Do), and the other end of the secondary coil (S) is grounded. There is also an output capacitor (Co) connected between the negative end of the output diode (Do) and the ground. In addition, the negative end of the output diode (Do) provides the output voltage (Vout) to the load.

When the MOS transistor (Q) is turned on by the pulse signals (DRV), the input DC voltage (Vin) is applied to the primary coil (P) of the converter. The output diode (Do) is blocked due to it is reversely biased due to the voltage sensed on the secondary coil (S) of the converter. At this moment, the power energy is saved on the primary coil (P) in the form of magnetic energy. When the MOS transistor (Q) is turned off, the polarity of the voltage at two ends of the primary coil (P) is inversed, and the polarity of the voltage of the secondary coil (S) is reversed. As such, the output diode (Do) is turned on, and the energy stored in the converter is released to the load. FIG. 2 is a current waveform of the above-mentioned flyback boost circuit. The pulse signals (DRV) are the control signals to turn on or off the MOS transistor (Q). Ip denotes the current signals of the primary coil (P). Is denotes the current signals of the secondary coil (S). As shown in FIG. 1, the relationship between the input voltage and the output voltage is $$Vout = \frac{Vin * D * K}{1 - D},$$

wherein K denotes the turn ratio of the secondary coil (S) to the primary coil (P) and D denotes the duty cycle ratio of the MOS transistor (Q). D satisfies the equation:

$$D = \frac{Ton}{Ton + Toff},$$

wherein Ton denotes the turn-on period of the MOS transistor (Q), and Toff denotes the turn-off period of the MOS transistor (Q). The parameters K and D have to be considered when designing the boost circuit. After the value of K is determined, the value of D has to be larger for at least 50 percent so as to achieve the boost function. Currently, only single primary coil (P) and single switch component are adopted. When the value of D is larger than 50 percent, the switch component may generate a huge amount of heat during the turn-on process. Thus, generally, the value of D is has to be under 50 percent, which limits the range of the output voltage (Vout).

SUMMARY

In order to overcome the above problem, the flyback boost circuit of the claimed invention not only can reduce the heat generated by the switch module but also can raise the voltage range.

In one aspect, a flyback boost circuit includes: a converter, a switch module, a driving module and an output diode, and a duty cycle ratio of the switch module equals to D, wherein the converter comprises n number of primary coils and one secondary coil, the switch module comprises n number of switch components, homonymous ends of the n number of primary coils respectively connects to the n number of switch components, and the other end of the n number of primary coils respectively connects to an input voltage, a turn ratio of the secondary coil to each primary coils is K; the driving module respectively provides control signals to n number of switch components such that only one of n number of switch components is sequentially turned on within a time period for which the duty cycle ratio equals to D, and a sum of the duty cycle ratio of the n number of switch components is D; the homonymous ends of the secondary coil connects to a positive end of the output diode, and the other end of the secondary coil is grounded, an output capacitor is connected between a negative end of the output diode and the ground, and the negative end of the output diode provides the output voltage to a load; and wherein n is an integer larger than or equaling to 2.

Wherein the value of n is of a range between 2 to 5.

Wherein the value of n equals to 2.

Wherein the duty cycle ratio of the n number of switch components are the same.

Wherein the switch component is a MOS transistor, a drain of the MOS transistor connects to the homonymous end of the primary coils, the source of the MOS transistor is grounded, and the gate of the MOS transistor connects to the control signals.

Wherein the input voltage is grounded via one filter capacitor.

In another aspect, a LED backlight driving circuit includes a power module and a boost circuit, the boost circuit converts the voltage provided by the power module to needed output voltage for the LED unit. The boost circuit is the above flyback boost circuit.

Wherein the LED unit comprises a plurality of LED string connected in parallel, wherein each LED string comprises a plurality of LEDs serially connected, each LED string is electrically grounded via a resistor, wherein the negative end of each LED string connects to the resistor, and the other end of the resistor is electrically grounded.

In another aspect, a liquid crystal device includes a LED backlight source, and the LED backlight source includes the above LED backlight driving circuit.

In view of the above, the converter of the flyback boost circuit adopts a plurality of primary coils and a plurality of switch components. When the converter performs the energy transformation, the limit of the duty cycle ratio is removed. Thus, the heat generated by the switch module is greatly reduced, and the voltage range is raised.

DETAILED DESCRIPTION OF THE EMBODIMENTS

Figure 1:
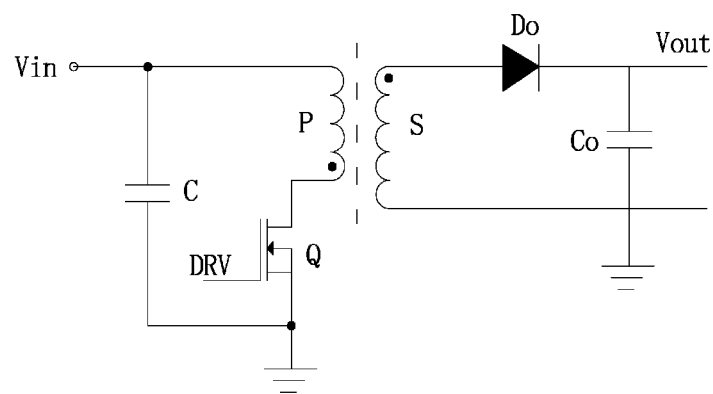
FIG. 1 is a circuit diagram of a typical flyback boost circuit.
Figure 2:
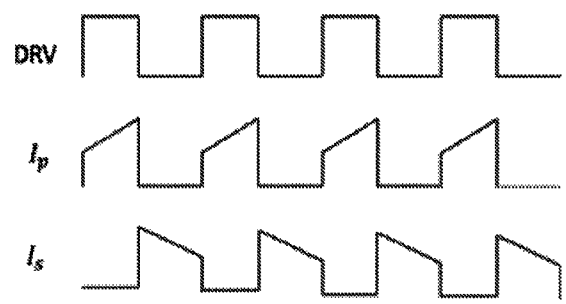
FIG. 2 is a current waveform diagram of the flyback boost circuit of FIG. 1.

Embodiments of the invention will now be described more fully hereinafter with reference to the accompanying drawings, in which embodiments of the invention are shown.

In order to solve the above problem, the converter of the claimed invention adopts a plurality of primary coils to perform the energy transformation. The primary coils are respectively controlled by a plurality of switch components such that the duty cycle ratio for the single switch component may be over 50 percent. In this way, the voltage range is raised.

Based on the above, one of the technical solutions of the claimed invention is one flyback boost circuit including a converter, a switch module, a driving module and an output diode. The converter includes primary coils and secondary coils. The turn ratio of the primary coils and the secondary coils is K. The homonymous end of the primary coils connects to the switch module. The switch module turns on or off the primary coils. The other end of the primary coils connects to the input voltage. The driving module provides control signals for turning on or off the switch module. The duty cycle ratio of the switch module is D. The homonymous ends of the secondary coils connects to the positive end of the output diode, and the other end of the secondary coil is grounded. An output capacitor is connected between the negative end of the output diode and the ground. In addition, the negative end of the output diode provides the output voltage to the load.

Wherein the converter includes n number of primary coils (P1 to Pn). The switch module includes n number of switch components (Q1~Qn). The homonymous end of the primary coils respectively connects to the n number of switch components. The other end of the primary coils respectively connects to the input voltage (Vin). The turn ratio of the secondary coil to each primary coils is K. The driving module respectively provides the control signals (DRV1 to DRVn) to n number of switch components such that only one of n number of switch components is sequentially turned on within a time period for which the duty cycle ratio equals to D. The duty cycle ratio of n number of switch components are respectively D1 to Dn, wherein n is an integer larger than or equaling to 2.

When performing the energy transformation, by configuring the turn-on time of the signal primary coil to a sum of the turn-on time of the plurality of primary coils, the turn-on time of each switch components is reduced, and thus the great amount of heat generated by the switch module is effectively reduced. At the same time, the duty cycle ratio (D) of the switch module may be configured to be over 50 percent, and thus the range of the output voltage is raised.

Preferably, the duty cycle ratio of the n number of switch components are the same, i.e., $D1=D2=\ldots=Dn=D/n$.

Preferably, the value of n is of a range between 2 to 5.

Preferably, the value of n equals to 2.

Preferably, the switch component is a MOS transistor. The drain of the MOS transistor connects to the homonymous end of the primary coils, the source of the MOS transistor is grounded, and the gate of the MOS transistor connects to the control signals.

Figure 3:
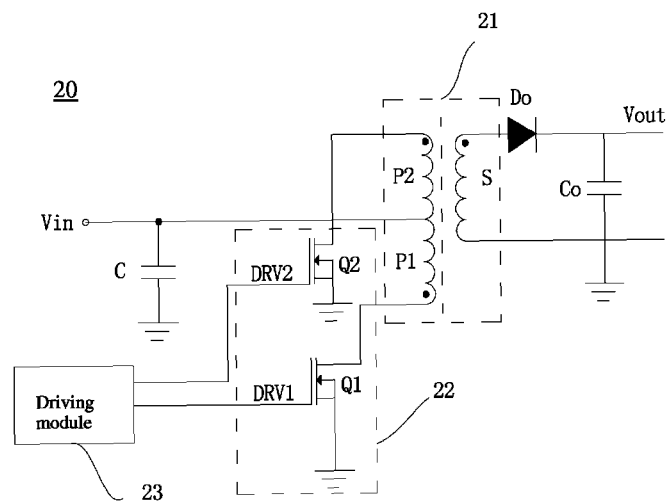
FIG. 3 is a circuit diagram of the flyback boost circuit in accordance with one embodiment.

FIG. 3 is a circuit diagram of the flyback boost circuit in accordance with one embodiment. The value of n is configured to be 2, which is only one example taken to illustrate the claimed invention.

As shown in FIG. 3, the flyback boost circuit 20 includes a converter 21, a switch module 22, a driving module 23, and an output diode (Do). The converter 21 includes two primary coils (P1, P2) and one secondary coil (S). The switch module 22 includes two MOS transistor (Q1, Q2). The winding directions of the two primary coils (P1, P2) are opposite. That is, the homonymous ends of the primary coils (P1, P2) respectively connect to the drains of the MOS transistor (Q1, Q2). The other end of the primary coils (P1, P2) respectively connects to the input voltage (Vin). The homonymous end of the secondary coil (S) connects to the positive end of the output diode (Do), and the other end of the secondary coil (S) is grounded. In addition, the duty cycle ratio of the secondary coil (S) to each primary coil (P1, P2) is one. One output capacitor (Co) is connected between the negative end of the output diode (Do) and the ground. In addition, the negative end of the output diode (Do) provides the output voltage (Vout) to the load. The sources of the MOS transistor (Q1, Q2) are respectively grounded. The gate of the MOS transistor (Q1, Q2) respectively connects to the driving module 23 to provide the control signals (DRV1, DRV2) for turning on or off the MOS transistor (Q1, Q2). As such, the primary coils (P1, P2) are turned on or off.

In the embodiment, the input voltage (Vin) is grounded via one filter capacitor (C).

In the embodiment, the duty cycle ratio of the switch module 22 is D. Within the Ton denoting the turn-on period Ton, the control signals (DRV1, DRV2) provided by the driving module 23 respectively control the MOS transistor (Q1, Q2). The MOS transistor (Q1, Q2) are respectively turned on at Ton1 and Ton2 such that the duty cycle ratio of the MOS transistor (Q1, Q2) are respectively D1 and D2. In the embodiment, $D1=D2=D/2$. In other embodiments, D1 is not the same with D2 only if the sum of D1 and D2 equals to D.

The operating process of the flyback boost circuit 20 will be described hereinafter.

According to the circuit principle of the flyback boost circuit 20, the current would not pass through the primary coil (P) and the secondary coil (S) at the same time. As shown in FIG. 3, when one of the MOS transistor (Q1, Q2) is turned on, the current may pass the primary coils (P1) or the primary coils (P2). In addition, when the homonymous end of the primary coils (P1) and the primary coils (P2) are at low level, the homonymous end of the secondary coil (S) is at low level and the output diode (Do) is turned off. When the MOS transistors (Q1, Q2) are turned off at the same time, the homonymous end of the secondary coil (S) is at high level and the output diode (Do) is turned on so as to provide the output voltage (Vout) to the load and to charge the output capacitor (Co) at the same time. When the output diode (Do) is turned off in the next period, the output capacitor (Co) provides the voltage to the output capacitor (Co).

Figure 4:
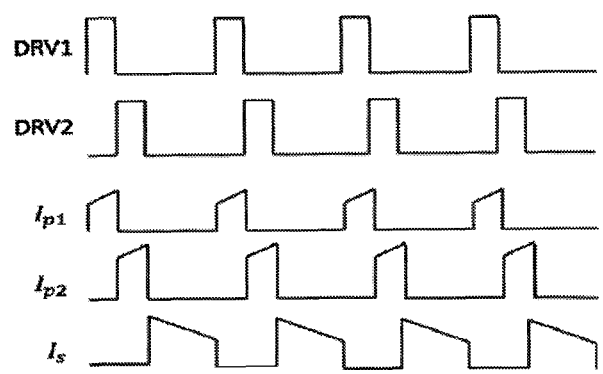
FIG. 4 is a current waveform diagram of the flyback boost circuit of FIG. 3.

FIG. 4 is a current waveform diagram of the flyback boost circuit of FIG. 3. Wherein DRV1 denotes the control signals to turn on or off the MOS transistor (Q1). DRV2 denotes the control signals to turn on or off the MOS transistor (Q2). Ip1 denotes the current signals of the primary coils (P1). Ip2 denotes the current signals of the primary coils (P2). Is denotes the current signals of the secondary coil (S).

In the embodiment, the relationship between the input voltage and the output voltage is $$Vout = \frac{Vin * D}{1 - D} = \frac{Vin * (D1 + D2)}{1 - (D1 + D2)}.$$

If the value of D is larger, the range of the output voltage (Vout) is larger. As the duty cycle ratio (D) of the switch module may be configured to be equal to the sum of the duty cycle ratios (D1, D2) of the plurality of the switch component, the duty cycle ratio (D) may be configured to be over 50 percent under the circumstance that the duty cycle ratio of each switch component is limited to be under 50 percent. For example, when the duty cycle ratio (D) of the switch module is configured to be 70 percent, the duty cycle ratio (D1) and the duty cycle ratio (D2) may be configured to be respectively 30 percent and 40 percent, or both are configured to be 35%. In view of the above, such circuit structure can reduce the turn-on time of single switch component so as to reduce the great amount of heat generated by the switch module. At the same time, the range of the output voltage is raised.

Figure 5:
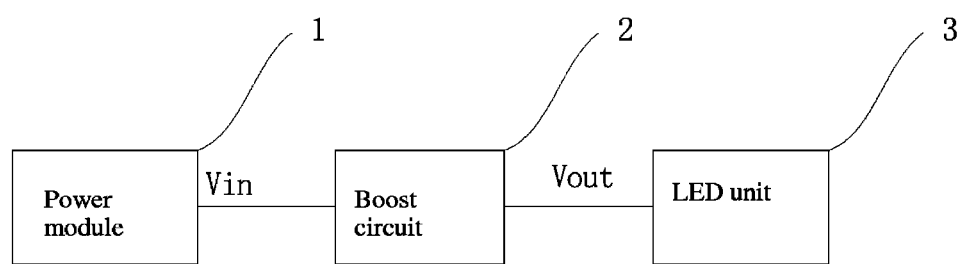
FIG. 5 is a connecting module diagram of the LED backlight driving circuit in accordance with one embodiment.

FIG. 5 is a connecting module diagram of the LED backlight driving circuit in accordance with one embodiment. As shown in FIG. 5, the LED backlight driving circuit includes a power module 1 and a boost circuit 2. The boost circuit 2 converts the input voltage (Vin) inputted by the power module 1 to the needed output voltage (Vout) for a LED unit 3. The boost circuit 2 may be the flyback boost circuit 20 in one embodiment.

The LED unit may be one or a plurality of LED string connected in parallel. Each LED string includes a plurality of LEDs serially connected. In addition, each LED string is electrically grounded via a resistor. The negative end of the LED string connects to the resistor, and the other end of the resistor is electrically grounded.

In view of the above, the converter of the flyback boost circuit adopts a plurality of primary coils (P) and a plurality of switch components. When the converter performs the energy transformation, the limit of the duty cycle ratio is removed. Thus, the heat generated by the switch module is greatly reduced, and the voltage range is raised. The circuit can be effectively applied to the LED backlight driving circuit.

It should be noted that the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A flyback boost circuit, comprising:
    a converter, a switch module, a driving module and an output diode, and a duty cycle ratio of the switch module equals to D, wherein
    the converter comprises n number of primary coils and one secondary coil, the switch module comprises n number of switch components, homonymous ends of the n number of primary coils respectively connects to the n number of switch components, and the other end of the n number of primary coils respectively connects to an input voltage, a turn ratio of the secondary coil to each primary coils is K, wherein K is a positive number;
    the driving module respectively provides control signals to n number of switch components such that only one of n number of switch components is sequentially turned on within a time period for which the duty cycle ratio equals to D, and a sum of the duty cycle ratio of the n number of switch components is D, wherein D is a positive number;
    the homonymous ends of the secondary coil connects to a positive end of the output diode, and the other end of the secondary coil is grounded, an output capacitor is connected between a negative end of the output diode and the ground, and the negative end of the output diode provides the output voltage to a load; and
    wherein n is an integer larger than or equaling to 2.

2. The flyback boost circuit as claimed in claim 1, wherein the value of n is of a range between 2 to 5.

3. The flyback boost circuit as claimed in claim 1, wherein the value of n equals to 2.

4. The flyback boost circuit as claimed in claim 3, wherein the duty cycle ratio of the two switch components are the same, the switch component is a MOS transistor, a drain of the MOS transistor connects to the homonymous end of the primary coils, the source of the MOS transistor is grounded, and the gate of the MOS transistor connects to the control signals.

5. The flyback boost circuit as claimed in claim 1, wherein the duty cycle ratio of the n number of switch components are the same.

6. The flyback boost circuit as claimed in claim 5, wherein the switch component is a MOS transistor, a drain of the MOS transistor connects to the homonymous end of the primary coils, the source of the MOS transistor is grounded, and the gate of the MOS transistor connects to the control signals.

7. The flyback boost circuit as claimed in claim 6, wherein the input voltage is grounded via one filter capacitor.

8. A LED backlight driving circuit, comprising:
    a power module and a boost circuit for converting an input voltage provided by the power module to a needed output voltage for a LED unit, wherein the boost circuit comprises a converter, a switch module, a driving module and an output diode, a duty cycle ratio of the switch module equals to D, wherein the converter comprises n number of primary coils and one secondary coil, the switch module comprises n number of switch components, homonymous ends of the n number of primary coils respectively connects to the n number of switch components, and the other end of the n number of primary coils respectively connects to an input voltage, a turn ratio of the secondary coil to each primary coils is K, wherein K is a positive number;

the driving module respectively provides control signals to n number of switch components such that only one of n number of switch components is sequentially turned on within a time period for which the duty cycle ratio equals to D, and a sum of the duty cycle ratio of the n number of switch components is D, wherein D is a positive number;

the homonymous ends of the secondary coil connects to a positive end of the output diode, and the other end of the secondary coil is grounded, an output capacitor is connected between a negative end of the output diode and the ground, and the negative end of the output diode provides the output voltage to a load; and wherein n is an integer larger than or equaling to 2.

9. The LED backlight driving circuit as claimed in claim 8, wherein the value of n is of a range between 2 to 5.

10. The LED backlight driving circuit as claimed in claim 8, wherein the value of n equals to 2.

11. The LED backlight driving circuit as claimed in claim 10, wherein the duty cycle ratio of the two switch components are the same, the switch component is a MOS transistor, a drain of the MOS transistor connects to the homonymous end of the primary coils, the source of the MOS transistor is grounded, and the gate of the MOS transistor connects to the control signals.

12. The LED backlight driving circuit as claimed in claim 8, wherein the duty cycle ratio of the n number of switch components are the same.

13. The LED backlight driving circuit as claimed in claim 12, wherein the switch component is a MOS transistor, a drain of the MOS transistor connects to the homonymous end of the primary coils, the source of the MOS transistor is grounded, and the gate of the MOS transistor connects to the control signals.

14. The LED backlight driving circuit as claimed in claim 13, wherein the input voltage is grounded via one filter capacitor.

15. The LED backlight driving circuit as claimed in claim 8, wherein the LED unit comprises a plurality of LED string connected in parallel, wherein each LED string comprises a plurality of LEDs serially connected, each LED string is electrically grounded via a resistor, wherein the negative end of each LED string connects to the resistor, and the other end of the resistor is electrically grounded.

16. A liquid crystal device, comprising:

a LED backlight source, a driving circuit of the LED backlight source comprises a power module and a boost circuit for converting an input voltage provided by the power module to a needed output voltage for a LED unit, wherein the boost circuit comprises a converter, a switch module, a driving module and an output diode, a duty cycle ratio of the switch module equals to D, wherein the converter comprises n number of primary coils and one secondary coil, the switch module comprises n number of switch components, homonymous ends of the n number of primary coils respectively connects to the n number of switch components, and the other end of the n number of primary coils respectively connects to an input voltage, a turn ratio of the secondary coil to each primary coils is K, wherein K is a positive number;

the driving module respectively provides control signals to n number of switch components such that only one of n number of switch components is sequentially turned on within a time period for which the duty cycle ratio equals to D, and a sum of the duty cycle ratio of the n number of switch components is D, wherein D is a positive number;

the homonymous ends of the secondary coil connects to a positive end of the output diode, and the other end of the secondary coil is grounded, an output capacitor is connected between a negative end of the output diode and the ground, and the negative end of the output diode provides the output voltage to a load; and wherein n is an integer larger than or equaling to 2.

17. The liquid crystal device as claimed in claim 16, wherein the value of n equals to 2.

18. The liquid crystal device as claimed in claim 17, wherein the duty cycle ratio of the two switch components are the same, the switch component is a MOS transistor, a drain of the MOS transistor connects to the homonymous end of the primary coils, the source of the MOS transistor is grounded, and the gate of the MOS transistor connects to the control signals.

19. The liquid crystal device as claimed in claim 16, wherein the duty cycle ratio of the n number of switch components are the same, the switch component is a MOS transistor, a drain of the MOS transistor connects to the homonymous end of the primary coils, the source of the MOS transistor is grounded, and the gate of the MOS transistor connects to the control signals.

20. The liquid crystal device as claimed in claim 19, wherein the input voltage is grounded via one filter capacitor.

* * * * *